United States Patent
Jin et al.

(10) Patent No.: US 9,634,572 B2
(45) Date of Patent: Apr. 25, 2017

(54) SWITCHING MODE POWER SUPPLY AND THE CONTROLLER AND THE METHOD THEREOF

(71) Applicant: Chengdu Monolithic Power Systems Co., Ltd., Chengdu (CN)

(72) Inventors: Yiqing Jin, Hangzhou (CN); Yuedong Chen, Chengdu (CN); Sicong Lin, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 31 days.

(21) Appl. No.: 14/859,070

(22) Filed: Sep. 18, 2015

(65) Prior Publication Data

US 2016/0087544 A1    Mar. 24, 2016

(30) Foreign Application Priority Data

Sep. 19, 2014   (CN) .......................... 2014 1 0484431

(51) Int. Cl.

| H02M 3/156 | (2006.01) |
|---|---|
| H02M 3/337 | (2006.01) |
| H02M 3/157 | (2006.01) |
| H02M 1/32 | (2007.01) |
| H02M 1/00 | (2006.01) |

(52) U.S. Cl.
CPC ............ *H02M 3/337* (2013.01); *H02M 1/32* (2013.01); *H02M 3/156* (2013.01); *H02M 3/157* (2013.01); *H02M 2001/0058* (2013.01); *Y02B 70/1433* (2013.01); *Y02B 70/1491* (2013.01)

(58) Field of Classification Search
None
See application file for complete search history.

(56) References Cited

U.S. PATENT DOCUMENTS

| 7,916,506 | B2* | 3/2011 | Zhang ................ | H02M 3/3376 363/21.02 |
|---|---|---|---|---|
| 8,766,605 | B2 | 7/2014 | Ren et al. | |
| 2003/0234631 | A1* | 12/2003 | Schulman ............. | A61N 1/025 318/677 |
| 2008/0258784 | A1* | 10/2008 | Fukumoto ......... | H02M 7/53806 327/136 |
| 2008/0290854 | A1* | 11/2008 | Uchiike ............. | H02M 3/1588 323/284 |
| 2009/0196072 | A1* | 8/2009 | Ye ........................ | H02M 7/493 363/17 |
| 2009/0244934 | A1* | 10/2009 | Wang ................ | H02M 3/33592 363/21.06 |
| 2012/0293141 | A1 | 11/2012 | Zhang et al. | |
| 2014/0176017 | A1 | 6/2014 | Kuang et al. | |
| 2014/0285163 | A1 | 9/2014 | Lin et al. | |

\* cited by examiner

*Primary Examiner* — Jeffrey Gblende
(74) *Attorney, Agent, or Firm* — Perkins Coie LLP (57) ABSTRACT

A switching mode power supply with resonant technology. The switching mode power supply current uses current polarity evaluation to avoid capacitive mode by triggering the capacitive protection if the evaluation indicates that the system will enter capacitive mode.

17 Claims, 8 Drawing Sheets

SWITCHING MODE POWER SUPPLY AND THE CONTROLLER AND THE METHOD THEREOF

CROSS-REFERENCE TO RELATED APPLICATION(S)

This application claims priority to and the benefit of Chinese Patent Application No. 201410484431.X, filed Sep. 19, 2014, which is incorporated herein by reference in its entirety.

TECHNICAL FIELD

The present invention relates to electronic circuits, more specifically, the present invention relates to switching mode power supplies and the method thereof.

BACKGROUND

Switching mode power supplies are widely used in the power conversion field due to high efficiency. In the application, the switching frequency of the switching mode power supply is set to be relatively high to reduce the size of the passive devices (e.g., transformer, filter). However, high switching frequency would lead to high switching loss. Resonant technology is introduced to both reduce the switching loss and maintain the high switching frequency. Typically, resonant technology comprises an inductor and a capacitor coupled between a power stage and an output load of the switching mode power supply. The switching frequency is adjusted to regulate the output power.

Figure 1:
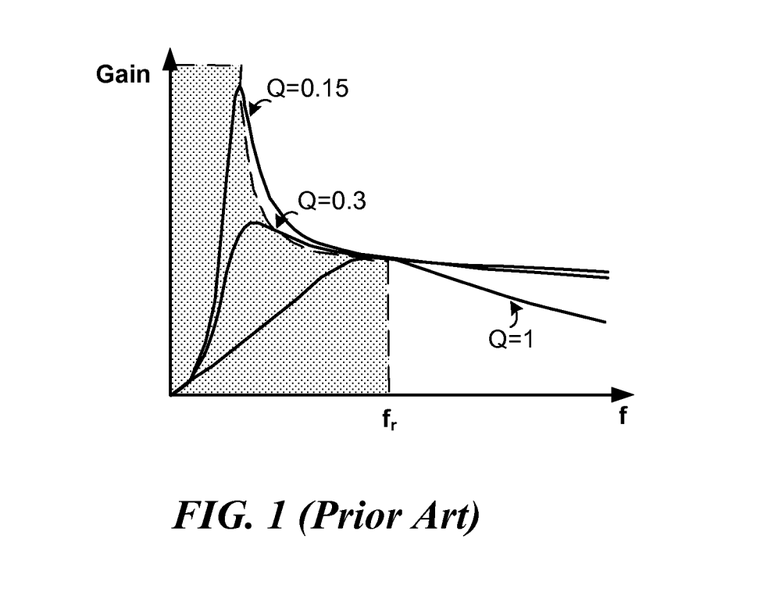
FIG. 1 schematically shows graphs of the circuit gain Gain varying with the switching frequency f of the switching mode power supply using conventional resonant technology.

FIG. 1 schematically shows graphs of the circuit gain Gain varying with the switching frequency f of the switching mode power supply using resonant technology, wherein f is the normalized frequency. Three graphs for the quality factor Q=1, Q=0.3 and Q=0.15 are illustrated. As shown in FIG. 1, the capacitor plays a dominant role inside the shaded portion, which is defined as capacitor mode; and the inductor plays a dominant role outside of the shaded portion, which is defined as inductive mode. When the switching frequency is at the left of the resonant frequency, the switching mode power supply would enter capacitor mode from the normal inductive mode if heavy load or short circuit suddenly happens (i.e., the quality factor Q increases suddenly). Under Inductive mode, power switches in the power stage can be controlled to be zero voltage switching (ZVS). On the contrary, capacitive mode is supposed to be avoided. Under capacitor mode, power switches in the power stage can not be controlled to be ZVS, which increases the switching loss. Furthermore, reverse recovery problem of the parasitic diode of the power switches would occur under capacitor mode, which would damage the power switches due to a shoot through between the high side power switch and the low side power switch.

Thus, there is a need to detect whether the switching mode power supply is under capacitor mode and to avoid undesired operation in the capacitor mode.

SUMMARY

It is an object of the present invention to provide a solution which solves the above problems.

A switching mode power supply with resonant technology and current polarity evaluation is provided. The switching mode power supply detects and evaluates the current direction of a current flowing through the resonant inductor before the turning off of the main power switch. If the evaluation indicates that the system will enter inductive mode, the switching mode power will operate as it is; and if the evaluation indicates that the system will enter capacitive mode, the switching mode power supply will trigger the capacitive protection to avoid capacitive mode.

The use of the similar reference label in different drawings indicates the same of like components.

DETAILED DESCRIPTION

Embodiments of circuits for switching mode power supply are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 2:
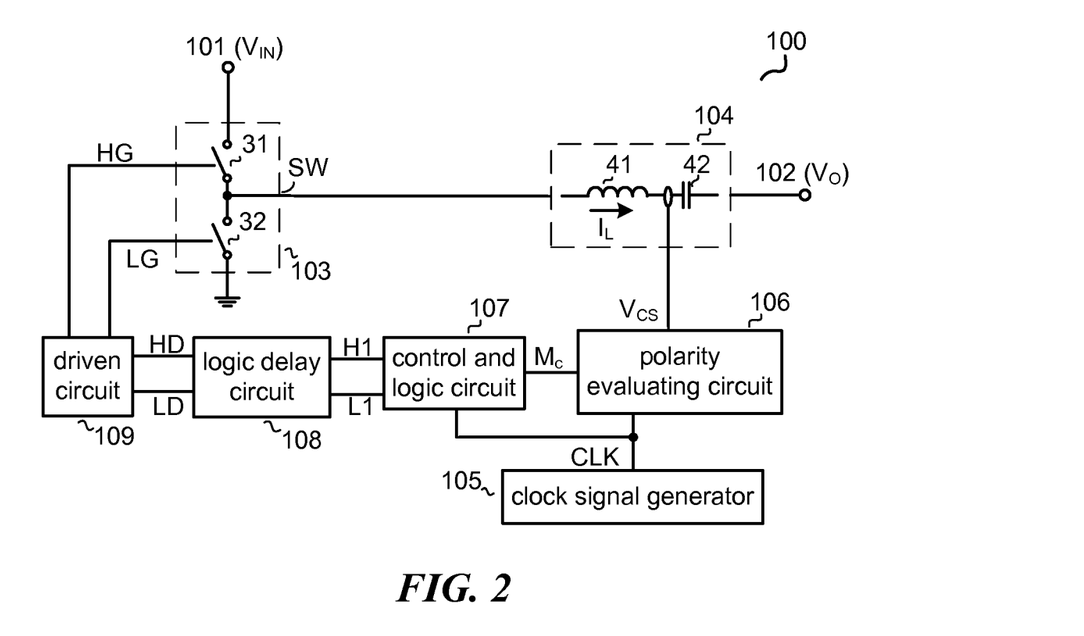
FIG. 2 schematically shows a switching mode power supply 100 in accordance with an embodiment of the present invention.

FIG. 2 schematically shows a switching mode power supply 100 in accordance with an embodiment of the present invention. In the example of FIG. 2, the switching mode power supply 100 comprises: an input port 101, configured to receive an input voltage $V_{IN}$; an output port 102, configured to provide an output voltage $V_o$; a power stage 103, having a first power switch 31 and a second power switch 32 series coupled between the input port 101 and a reference ground; a resonant tank 104, coupled between the output port 102 and the series coupling node (switching node) SW of the first power switch 31 and the second power switch 32, the resonant tank 104 having a resonant inductor 41 and a resonant capacitor 42; a clock signal generator 105, configured to generate a clock signal CLK; a polarity evaluating circuit 106, configured to receive the clock signal CLK and a current sense signal $V_{cs}$ indicative of a current $I_L$ flowing through the resonant inductor 41, wherein the polarity evaluating circuit 106 generates a capacitive evaluated signal $M_c$ based on the current sense signal $V_{cs}$ and the clock signal CLK; a control and logic circuit 107, coupled to the clock signal generator 105 and the polarity evaluating circuit 106 to receive the clock signal CLK and the capacitive evaluated signal $M_c$, respectively, wherein the control and logic circuit 107 generates a first logical signal H1 and a second logical signal L1 based on the clock signal CLK and the capacitive evaluated signal $M_c$; a logic delay circuit 108, coupled to the control and logic circuit 107 to receive the first logical signal H1 and the second logical signal L1, wherein the logic delay circuit 108 generates a first logical delayed signal HD and a second logical delayed signal LD based on the first logical signal H1 and the second logical signal L1; and a driven circuit 109, coupled to the logical delay circuit 108 to receive the first logical delayed signal HD and the second logical delayed signal LD to generate a first driving signal HG and a second driving signal LG, to control the first power switch 31 and the second power switch 32, respectively.

In one embodiment, the polarity evaluating circuit 106 evaluates the current polarity (current direction) of the current sense signal $V_{cs}$ at the falling edges of the first logical signal H1 and the second logical signal L1, to generate the capacitive evaluated signal $M_c$. If the current polarity of the current sense signal $V_{cs}$ at the falling edge of the first logical signal H1 is positive (i.e., the current $I_L$ flows from the switching node SW to the output port 102), or if the current polarity of the current sense signal $V_{cs}$ at the falling edge of the second logical signal L1 is negative (i.e., the current $I_L$ flows from the output port 102 to the switching node SW), the switching mode power supply enters inductive mode, which is the desired mode of the system. On the contrary, if the current polarity of the current sense signal $V_{cs}$ at the falling edge of the first logical signal H1 is negative (i.e., the current $I_L$ flows from the output port 102 to the switching node SW), or if the current polarity of the current sense signal $V_{cs}$ at the falling edge of the second logical signal L1 is positive (i.e., the current $I_L$ flows from the switching node SW to the output port 102), the switching mode power supply enters capacitive mode. Then the logic and control circuit of the system would trigger the capacitive protection to avoid capacitive mode.

From the following text, the falling edge of the first logical signal H1 synchronizes with the falling edge of the clock signal CLK in the switching mode power supply 100.

Figure 3:
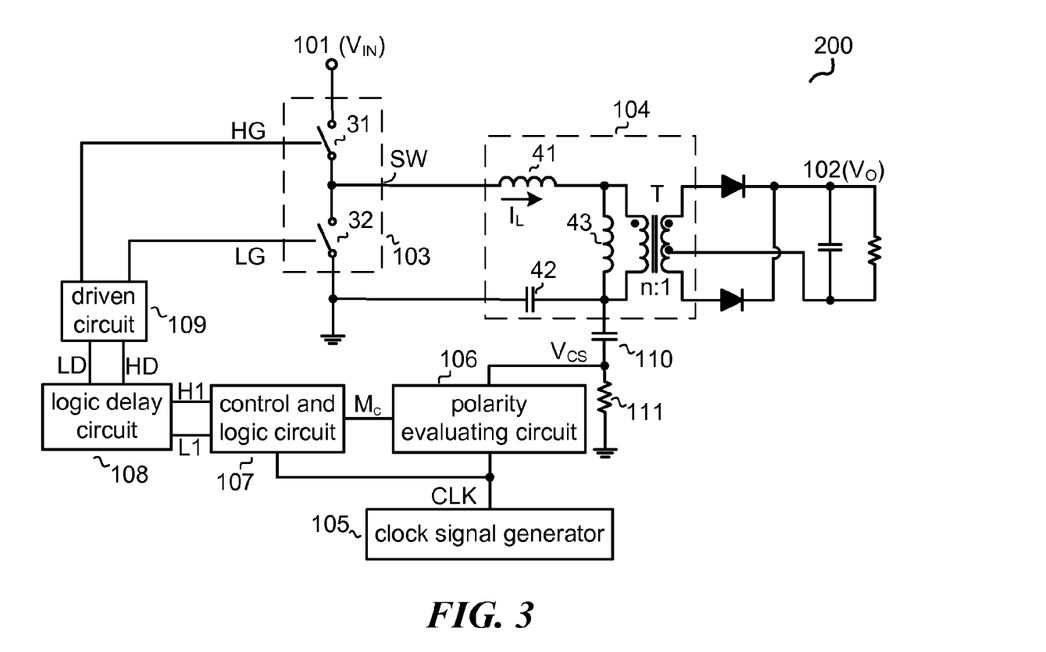
FIG. 3 schematically shows a switching mode power supply 200 in accordance with an embodiment of the present invention.

FIG. 3 schematically shows a switching mode power supply 200 in accordance with an embodiment of the present invention. In the example of FIG. 3, the resonant tank 104 comprises the resonant inductor 41, the resonant capacitor 42 and a magnetic inductor 43 (the so-called LLC resonant circuit) series coupled between the switching node SW and the reference ground. The switching mode power supply 200 further comprises: a sense capacitor 110 and sense resistor 111 series coupled across the resonant capacitor 42. The current sense signal $V_{cs}$ is provided at the series coupling node of the sense capacitor 110 and the sense resistor 111. The other circuit configuration of the switching mode power supply 200 is similar to the switching mode power supply 100, which would not be discussed for brevity.

Figure 4:
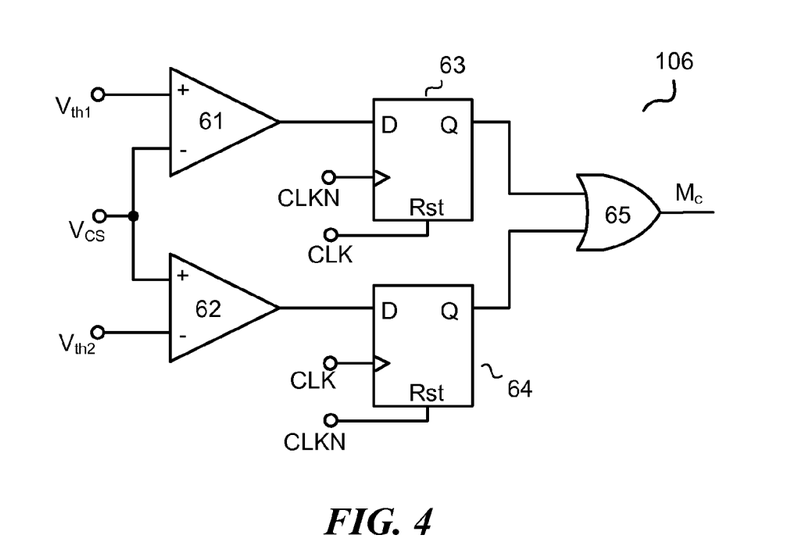
FIG. 4 schematically shows a circuit configuration of the polarity evaluating circuit 106 in accordance with an embodiment of the present invention.

FIG. 4 schematically shows a circuit configuration of the polarity evaluating circuit 106 in accordance with an embodiment of the present invention. In the example of FIG. 4, the polarity evaluating circuit 106 comprises: a positive comparator 61, having a first input terminal, a second input terminal and an output terminal, wherein the first input terminal is configured to receive the current sense signal $V_{cs}$, the second input terminal is configured to receive a first threshold $V_{th1}$, and wherein the positive comparator 61 generates a positive comparison signal based on the current sense signal $V_{cs}$ and the first threshold $V_{th1}$; a negative comparator 62, having a first input terminal, a second input terminal and an output terminal, wherein the first input terminal is configured to receive the current sense signal $V_{cs}$, the second input terminal is configured to receive a second threshold $V_{th2}$, and wherein the negative comparator 62 generates a negative comparison signal based on the current sense signal $V_{cs}$ and the second threshold $V_{th2}$; a first D flip flop 63, having a trigger input terminal D, a clock input terminal, a reset terminal Rst and an output terminal, wherein the trigger input terminal D is coupled to the positive comparator 61 to receive the positive comparison signal, the clock input terminal is configured to receive an inverted clock signal CLKN (i.e., the complementary signal of the clock signal CLK), and the reset terminal Rst is configured to receive the clock signal CLK, wherein based on the positive comparison signal and the rising edge of the inverted clock signal CLKN, the first D flip flop 63 generates a positive evaluated signal at the output terminal, and resets the positive evaluated signal at the rising edge of the clock signal CLK; a second D flip flop 64, having a trigger input terminal D, a clock input terminal, a reset terminal Rst and an output terminal, wherein the trigger input terminal D is coupled to the negative comparator 62 to receive the negative comparison signal, the clock input terminal is configured to receive the clock signal CLK, and the reset terminal Rst is configured to receive the inverted clock signal CLKN, wherein based on the negative comparison signal and the rising edge of the clock signal CLK, the second D flip flop 64 generates a negative evaluated signal at the output terminal, and resets the negative evaluated signal at the rising edge of the inverted clock signal CLKN; and a logical OR circuit 65, having a first input terminal, a second input terminal and an output terminal, wherein the first input terminal is configured to receive the positive evaluated signal, the second input terminal is configured to receive the negative evaluated signal, wherein based on the positive evaluated signal and the negative evaluated signal, the logical OR circuit 65 generates the capacitive evaluated signal $M_c$ at the output terminal.

In one embodiment, the first threshold $V_{th1}$ and the second threshold $V_{th2}$ are opposite to each other, i.e., $V_{th1}=V_{th2}$. The first threshold $V_{th1}$ and the second threshold $V_{th2}$ are around zero, e.g., $V_{th1}$=50 mV, $V_{th2}$=−50 mV.

Figure 5:
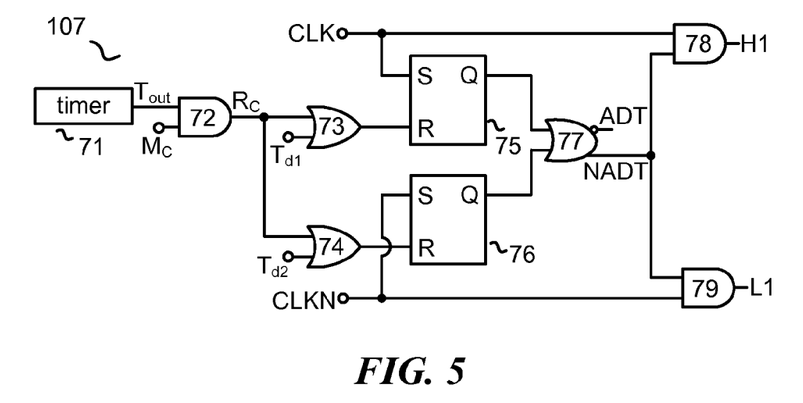
FIG. 5 schematically shows a circuit configuration of the control and logic circuit 107 in accordance with an embodiment of the present invention.

FIG. 5 schematically shows a circuit configuration of the control and logic circuit 107 in accordance with an embodiment of the present invention. In the example of FIG. 5, the control and logic circuit 107 comprises: a timer 71, configured to provide a timing signal $T_{out}$; a first logical AND circuit 72, having a first input terminal, a second input terminal and an output terminal, wherein the first input terminal is coupled to the timer 71 to receive the timing signal $T_{out}$, the second input terminal is configured to receive the capacitive evaluated signal $M_c$, wherein based on the timing signal $T_{out}$ and the capacitive evaluated signal $M_c$, the first logical AND circuit 72 generates a capacitive reset signal $R_c$; a first logical OR circuit 73, having a first input terminal, a second input terminal and an output terminal, wherein the first input terminal is coupled to the first logical AND circuit 72 to receive the capacitive reset signal $R_c$, the second input terminal is configured to receive a first dead time setting signal $T_{d1}$, wherein based on the capacitive reset signal $R_c$ and the first dead time setting signal $T_{d1}$, the first logical OR circuit 73 generates a first reset signal at the output terminal; a second logical OR circuit 74, having a first input terminal, a second input terminal and an output terminal, wherein the first input terminal is coupled to the first logical AND circuit 72 to receive the capacitive reset signal $R_c$, the second input terminal is configured to receive the second dead time setting signal $T_{d2}$, wherein based on the capacitive reset signal $R_c$ and the second dead time setting signal $T_{d2}$, the second logical OR circuit 74 generates a second reset signal at the output terminal; a first RS flip flop 75, having a set input terminal S, a reset input terminal R and an output terminal Q, wherein the set input terminal S is configured to receive the clock signal CLK, the reset input terminal R is coupled to the first logical OR circuit 73 to receive the first reset signal, wherein based on the clock signal CLK and the first reset signal, the first RS flip flop 75 generates the first dead time signal at the output terminal; a second RS flip flop 76, having a set input terminal S, a reset input terminal R and an output terminal Q, wherein the set input terminal S is configured to receive the inverted clock signal CLKN, the reset input terminal is coupled to the second logical OR circuit 74 to receive the second reset signal, wherein based on the inverted clock signal CLKN and the second reset signal, the second RS flip flop 76 generates a second dead time signal at the output terminal; a logical NOR circuit 77, having a first input terminal, a second input terminal, a first output terminal and a second output terminal, wherein the first input terminal is coupled to the first RS flip flop 75 to receive the first dead time signal, the second input terminal is coupled to the second RS flip flop 76 to receive the second dead time signal, wherein based on the first dead time signal and the second dead time signal, the logical NOR circuit 77 generates a dead time signal ADT at the first output terminal and a non-dead time signal NADT at the second output terminal; a second logical AND circuit 78, having a first input terminal, a second input terminal and an output terminal, wherein the first input terminal is coupled to the logical NOR circuit 77 to receive the non-dead time signal NADT, the second input terminal is configured to receive the clock signal CLK, wherein based on the non-dead time signal NADT and the clock signal CLK, the second logical AND circuit 78 generates the first logical signal H1 at the output terminal; and a third logical AND circuit 79, having a first input terminal, a second input terminal and an output terminal, wherein the first input terminal is coupled to the logical NOR circuit 77 to receive the non-dead time signal NADT, the second input terminal is configured to receive the inverted clock signal CLKN, wherein based on the non-dead time signal NADT and the inverted clock signal CLKN, the third logical AND circuit 79 generates the second logical signal L1 at the output terminal.

In one embodiment, the effective time length of the timing signal $T_{out}$ is longer than that of the first dead time setting signal $T_{d1}$ and the second dead time setting signal $T_{d2}$.

In one embodiment, the first dead time setting signal $T_{d1}$ and the second dead time setting signal $T_{d2}$ may be adaptively varied according to the actual condition of the switching mode power supply. For example, the first dead time setting signal $T_{d1}$ and the second dead time setting signal $T_{d2}$ may be varied with the voltage $V_{sw}$ at the switching node SW.

Because of the existence of the second logical AND circuit 78 and the third logical AND circuit 79, the falling edge of the first logical signal H1 synchronizes with the falling edge of the clock signal CLK (i.e., the rising edge of the inverted clock signal CLKN), and the falling edge of the second logical signal L1 synchronizes with the falling edge of the inverted clock signal CLKN (i.e., the rising edge of the clock signal CLK).

Figure 6:
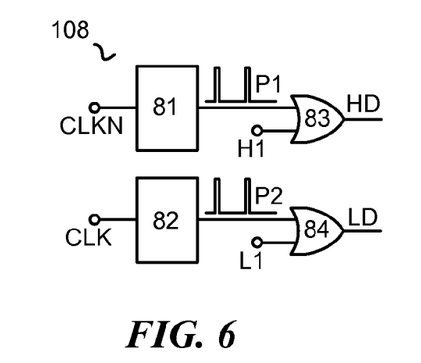
FIG. 6 schematically shows a circuit configuration of the logic delay circuit 108 in accordance with an embodiment of the present invention.

FIG. 6 schematically shows a circuit configuration of the logic delay circuit 108 in accordance with an embodiment of the present invention. In the example of FIG. 6, the logic delay circuit 108 comprises: a first short pulse circuit 81, configured to receive the inverted clock signal CLKN to generate a first short pulse signal P1 in response to the rising edge of the inverted clock signal CLKN; a first logical OR unit 83, having a first input terminal, a second input terminal and an output terminal, wherein the first input terminal is coupled to the first short pulse circuit 81 to receive the first short pulse signal P1, the second input terminal is configured to receive the first logical signal H1, wherein based on the first short pulse signal P1 and the first logical signal H1, the first logical OR unit 83 generates a first logical delayed signal HD; a second short pulse circuit 82, configured to receive the clock signal CLK to generate a second short pulse signal P2 in response to the rising edge of the clock signal CLK; and a second logical OR unit 84, having a first input terminal, a second input terminal and an output terminal, wherein the first input terminal is coupled to the second short pulse circuit 82 to receive the second short pulse signal P2, the second input terminal is configured to receive the second logical signal L1, wherein based on the second short pulse signal P2 and the second logical signal L1, the second logical OR unit 84 generates a second logical delayed signal LD. So the first logical delayed signal HD and the second logical delayed signal LD are generated by delaying the first logical signal H1 and the second logical signal L1 for a short pulse time period via the short pulse circuits and the logical OR units.

Figure 7:
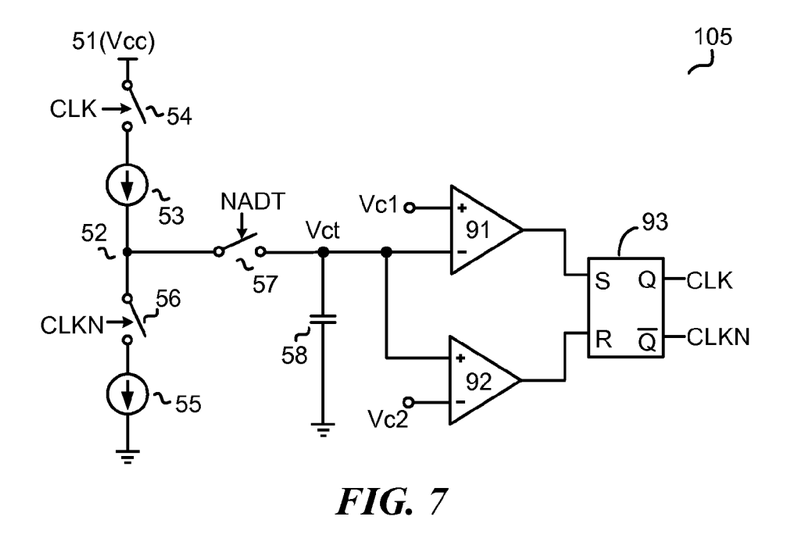
FIG. 7 schematically shows a circuit configuration of the clock signal generator 105 in accordance with an embodiment of the present invention.

FIG. 7 schematically shows a circuit configuration of the clock signal generator 105 in accordance with an embodiment of the present invention. In the example of FIG. 7, the clock signal generator 105 comprises: a supply node 51, coupled to a power supply Vcc; an intermediate node 52; a first current source 53 and a first control switch 54, series coupled between the supply node 51 and the intermediate node 52; a second current source 55 and a second control switch 56, series coupled between the intermediate node 52 and the reference ground; a third control switch 57, having a first end and a second end, wherein the first end is coupled to the intermediate node 52; a charge capacitor 58, coupled between the second end of the third control switch 57 and the reference ground; a first comparator 91, having a first input terminal, a second input terminal and an output terminal, wherein the first input terminal is configured to receive a first voltage reference Vc1, the second input terminal is coupled to the charge capacitor 58 to receive a voltage Vct across the charge capacitor 58, wherein based on the first voltage reference Vc1 and the voltage Vct across the charge capacitor 58, the first comparator 91 generates a first comparison signal at the output terminal; a second comparator 92, having a first input terminal, a second input terminal and an output terminal, wherein the first input terminal is configured to receive a second voltage reference Vc2, the second input terminal is coupled to the charge capacitor 58 to receive the voltage Vct across the charge capacitor 58, wherein based on the second voltage reference Vc2 and the voltage Vct across the charge capacitor 58, the second comparator 92 generates a second comparison signal at the output terminal; and a RS flip flop 93, having a set terminal S, a reset terminal R, a first output terminal Q and a second output terminal /Q, wherein the set terminal S is coupled to the first comparator 91 to receive the first comparison signal, the reset terminal R is coupled to the second comparator 92 to receive the second comparison signal, wherein based on the first comparison signal and the second comparison signal, the RS flip flop 93 generates the clock signal at the first output terminal Q and the inverted clock signal CLKN at the second output terminal /Q.

In one embodiment, the first control switch 54 is controlled to be ON and OFF by the clock signal CLK, the second control switch 56 is controlled to be ON and OFF by the inverted clock signal CLKN, the third control switch 57 is controlled to be ON and OFF by the non-dead time signal NADT. During the effective time period (e.g., logical high) of the non-dead time signal NADT, at least one of the first power switch 31 and the second power switch 32 is ON; and during the effective time period (e.g., logical high) of the dead time signal ADT, both the first power switch 31 and the second power switch 32 are OFF. Because of the existence of the third control switch 57, the clock signal generator 105 stops oscillation during the dead time, so that the clock signal CLK and the inverted clock signal CLKN have same high level widths, i.e., the clock signal CLK and the inverted clock signal CLKN each has a 50% duty cycle.

In one embodiment, the first voltage reference Vc1 is lower than the second voltage reference Vc2, e.g., Vc1=1V, Vc2=3V.

The operation principle of the switching mode power supply 100 and/or 200 is illustrated below in combination of the waveforms shown in FIG. 8.

1) 0-t0: As shown in FIG. 8, the clock signal CLK is logical low, and the inverted clock signal CLKN is logical high at the beginning. The dead time of this switching cycle has passed, so the first power switch 31 is OFF, and the second power switch 32 is ON. Then the voltage $V_{sw}$ at the switching node SW is pulled to ground. The current flowing through the resonant inductor 41 starts to decrease from its forward peak value to zero, and then reversely increases. Accordingly, the current sense signal $V_{cs}$ also starts to decrease from its forward peak value to zero, and then reversely increases.

At the clock signal generator 105, the first control switch 54 is OFF, the second control switch 56 is ON, and the third control switch 57 is ON. Then the charge capacitor 58 is discharged by the second current source 55, and the voltage Vct across the charge capacitor 58 starts to decrease. At time point t0, the voltage Vct across the charge capacitor 58 decreases to be lower than the first voltage reference Vc1. Accordingly, the first comparison signal turns to be logical high, which sets the RS flip flop 93, causing the clock signal CLK to jump to logical high level, and the inverted clock signal CLKN to jump to logical low level.

At the polarity evaluating circuit 106, the positive comparator 61 compares the current sense signal $V_{cs}$ with the first threshold $V_{th1}$, and the negative comparator 62 compares with the current sense signal $V_{cs}$ with the second threshold $V_{th2}$. As discussed above, the clock signal CLK has a rising edge at time point t0 (from logical low level to logical high level). As shown in FIG. 8, the current sense signal $V_{cs}$ is lower than the second threshold $V_{th2}$ at this time point (i.e., the current polarity of the current flowing through the resonant inductor 41 is negative). Accordingly, the negative comparison signal is logical low, which will not trigger the second D flip flop 64. As a result, the capacitive evaluated signal $M_c$ is logical low, which indicates that the switching mode power supply will enter inductive mode.

At the control and logic circuit 107, the capacitive reset signal $R_c$ is logical low due to the low logic level of the capacitive evaluated signal $M_c$. Then the first reset signal is determined by the first dead time setting signal $T_{d1}$, and the second reset signal is determined by the second dead time setting signal $T_{d2}$. So the dead time signal ADT and the non-dead time signal NADT are also determined by the first dead time setting signal $T_{d1}$ and the second dead time setting signal $T_{d2}$.

At the logic delay circuit 108, the second short pulse circuit 82 generates the second short pulse signal P2 in response to the rising edge of the clock signal CLK at time point t0. This second short pulse signal P2 is added to the second logical signal L1, to generate the second logical delayed signal LD. So the second power switch 32 is turned off after a short pulse time period of the time point t0. That is, the turning off of the second power switch 32 is lagged behind the rising edge of the clock signal CLK for the short pulse time period.

2) t0-t1: As discussed above, at time point t0, the inverted clock signal CLKN jumps to logical low level, and the clock signal CLK jumps to logical high level, and the second power switch 32 continues to be ON for the short pulse time period. Then, after the dead time period, the first logical signal H1 (i.e., the first driving signal HG) jumps to logical high level. Accordingly, the first power switch 31 is turned on.

At the clock signal generator 105, the first control switch 54 is ON, the second control switch 56 is OFF, and the third control switch 57 is ON. Then the charge capacitor 58 is charged by the first current source 53 and the voltage Vct across the charge capacitor 58 starts to increase linearly. At time point t1, the voltage Vct across the charge capacitor 58 increases to be higher than the second voltage reference Vc2. Accordingly, the second comparison signal turns to be logical high, which resets the RS flip flop 93, causing the clock signal CLK to jump to logical low level, and the inverted clock signal CLKN to jump to logical high level.

Figure 8:
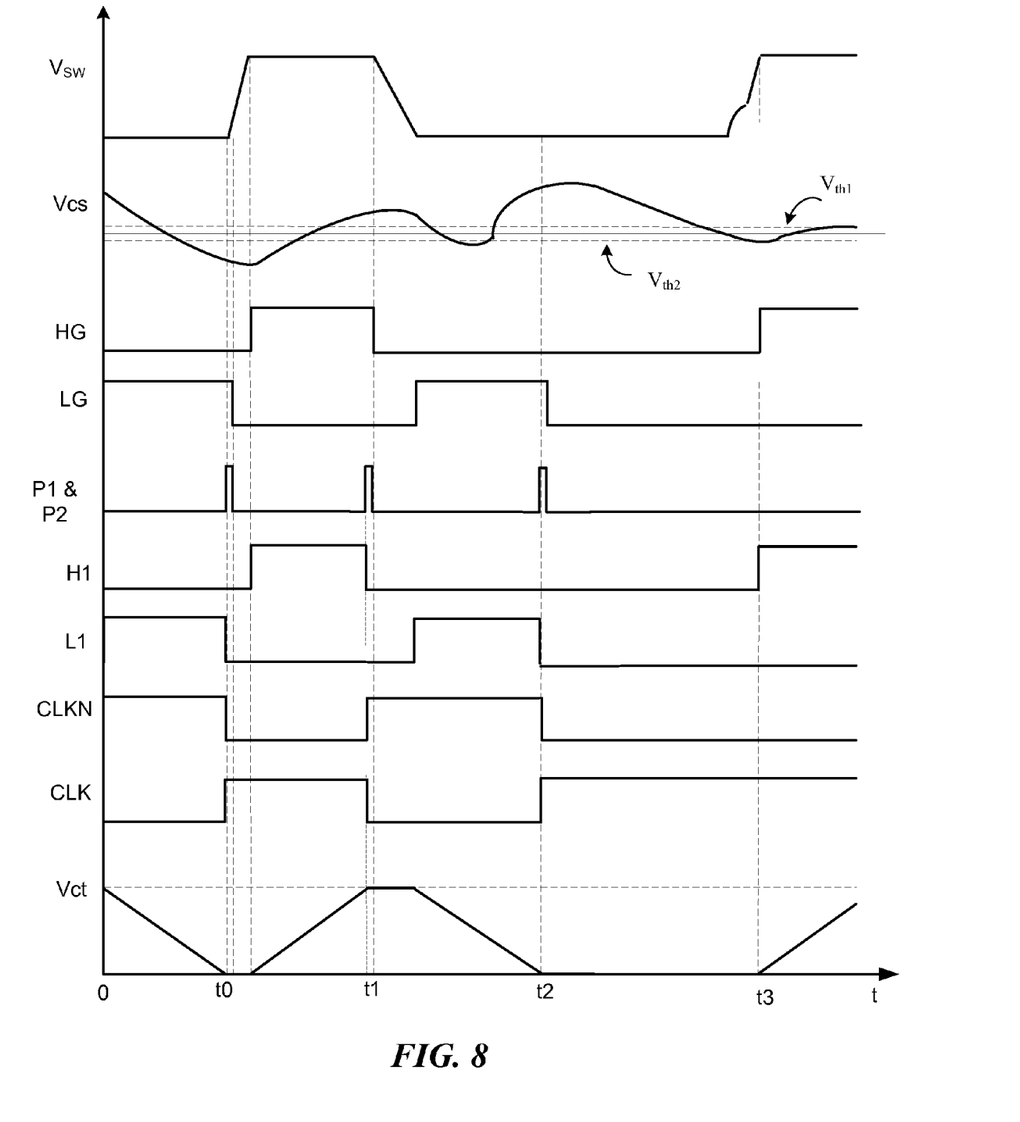
FIG. 8 schematically shows waveforms of the switching mode power supply 100 and/or 200.

As shown in FIG. 8, at time point t1, the current sense signal $V_{cs}$ is higher than the first threshold $V_{th1}$ (i.e., the current polarity of the current flowing through the resonant inductor 41 is positive). Accordingly, the positive comparison signal is logical low, which will not trigger the first D flip flop 63. As a result, the capacitive evaluated signal MC is logical low, which indicates that the switching mode power supply will enter inductive mode. So both the control and logic circuit 107 and the logic delay circuit 108 work as they do as in time interval 0-t0.

3) t1-t2: The switching mode power supply 100 and/or 200 in this time interval operates similarly as in the time interval of 0-t0. However, as shown in FIG. 8, at time point t2, where the clock signal CLK jumps to logical high level and the inverted clock signal CLKN jumps to logical low level, the current sense signal $V_{cs}$ is higher than the second threshold $V_{th2}$ (i.e., the current polarity of the current flowing through the resonant inductor 41 is positive). Accordingly, the negative comparison signal is logical high, which will trigger the second D flip flop 64, causing the negative evaluated signal to be logical high. As a result, the capacitive evaluated signal $M_c$ is logical high, which indicates that the switching mode power supply will enter capacitive mode.

Accordingly, at the control and logic circuit 107, the timing signal $T_{out}$ starts to take effect. During the effective time period (e.g., logical high) of the timing signal $T_{out}$, the first RS flip flop 75 and the second RS flip flop 76 are reset by the capacitive reset signal $R_c$ via the first logical OR circuit 73 and the second logical OR circuit 74, respectively. As a result, the dead time signal ADT is determined by the timing signal $T_{out}$. The dead time is prolonged. That is, the switching mode power supply 100 and/or 200 executes the capacitive protection.

As shown in FIG. 8, at time point t3, the current polarity renews normal, and the voltage $V_{sw}$ at the switching node SW goes high. Accordingly, the first dead time setting signal $T_{d1}$ turns to logical high level, which resets the first RS flip flop 75, causing the switching mode power supply 100 and/or 200 renews normal operation: the first power switch 31 is ON, and the second power switch 32 is OFF; and the system enters new switching cycle, and operates as discussed above. If the first dead time setting signal $T_{d1}$ does not turns to high from low when the timer 71 times over, the timing signal $T_{out}$ will set to high, which resets the first RS flip flop 75, causing the switching mode power supply 100 and/or 200 renews normal operation: the first power switch 31 is ON, and the second power switch 32 is OFF; the system enters a new switching cycle, and operates as discussed above.

Because the polarity evaluating circuit 106 generates the capacitive evaluated signal $M_c$ by evaluating the current direction of the current sense signal $V_{cs}$ based on the rising edges of the clock signal CLK and the inverted clock signal CLKN, and the first logical signal H1 and the second logical signal L1 are delayed by the logical delay circuit 108 for a short pulse time period, so the first driving signal HG and the second driving signal LG lag behind the rising edges of the clock signal CLK and the inverted clock signal CLKN for a short pulse time period (tens of nanoseconds). So several embodiments of the foregoing switching mode power supply detect and evaluate the current direction of the current flowing through the resonant inductor before the turning off of the first power switch or before the turning off of the second power switch: if the evaluation indicates that the system will enter inductive mode, the switching mode power supply operates normally; if the evaluation indicates that the system will enter capacitive mode, the switching mode power supply triggers the capacitive protection. So several embodiments of the foregoing switching mode power supply prevent the system from operating under capacitive mode, and the capacitive switch is avoided.

Figure 9:
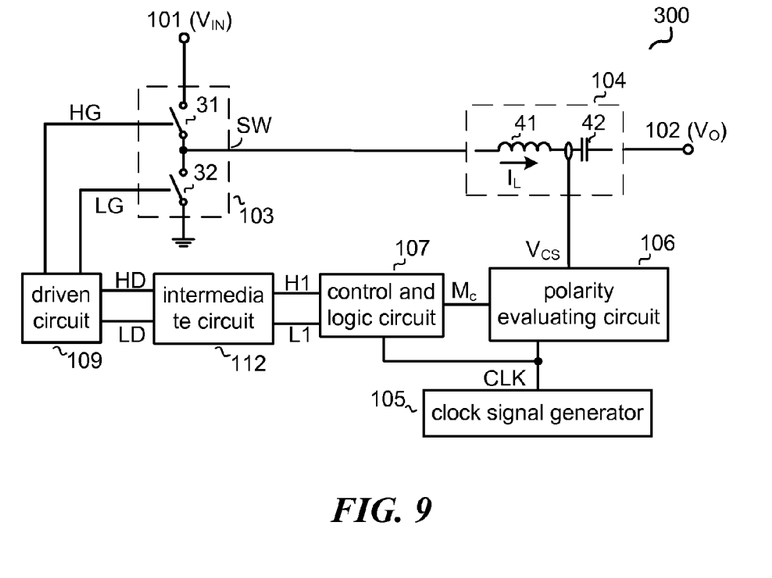
FIG. 9 schematically shows a switching mode power supply 300 in accordance with an embodiment of the present invention.

In one embodiment, the switching mode power supply does not have the logical delay circuit 108. The switching mode power uses its own internal delay to delay the signal. FIG. 9 schematically shows a switching mode power supply 300 in accordance with an embodiment of the present invention. In the example of FIG. 9, the switching mode power supply 300 comprises: an input port 101, configured to receive an input voltage $V_{IN}$; an output port 102, configured to provide an output voltage $V_o$; a power stage 103, having a first power switch 31 and a second power switch 32 series coupled between the input port 101 and a reference ground; a resonant tank 104, coupled between the output port 102 and the series coupling node (switching node) SW of the first power switch 31 and the second power switch 32, the resonant tank 104 having a resonant inductor 41 and a resonant capacitor 42; a clock signal generator 105, configured to generate a clock signal CLK; a polarity evaluating circuit 106, configured to receive the clock signal CLK and a current sense signal $V_{cs}$ indicative of a current flowing through the resonant inductor 41, wherein the polarity evaluating circuit 106 generates a capacitive evaluated signal $M_c$ based on the current sense signal $V_{cs}$ and the clock signal CLK; a control and logic circuit 107, coupled to the clock signal generator 105 and the polarity evaluating circuit 106 to receive the clock signal CLK and the capacitive evaluated signal $M_c$, respectively, wherein the control and logic circuit 107 generates a first logical signal H1 and a second logical signal L1 based on the clock signal CLK and the capacitive evaluated signal $M_c$; an intermediate circuit 112, coupled to the control and logic circuit 107 to receive the first logical signal H1 and the second logical signal L1, wherein the intermediate circuit 112 generates a first logical delayed signal HD and a second logical delayed signal LD based on the first logical signal H1 and the second logical signal L1; and a driven circuit 109, coupled to the intermediate circuit 112 to receive the first logical delayed signal HD and the second logical delayed signal LD to generate a first driving signal HG and a second driving signal LG, to control the first power switch 31 and the second power switch 32, respectively.

In one embodiment, the intermediate circuit 112 comprises a plurality of intermediate processing circuits, e.g., buffers, logical circuits, etc. Because each intermediate processing circuit has its internal transmission delay (e.g., tens of nanoseconds) during the delivery of the first logical signal H1 and the second logical signal L1, the first logical delayed signal HD and the second logical delayed signal LD has a certain delay compared to the first logical signal H1 and the second logical signal L1, respectively.

Figure 10:
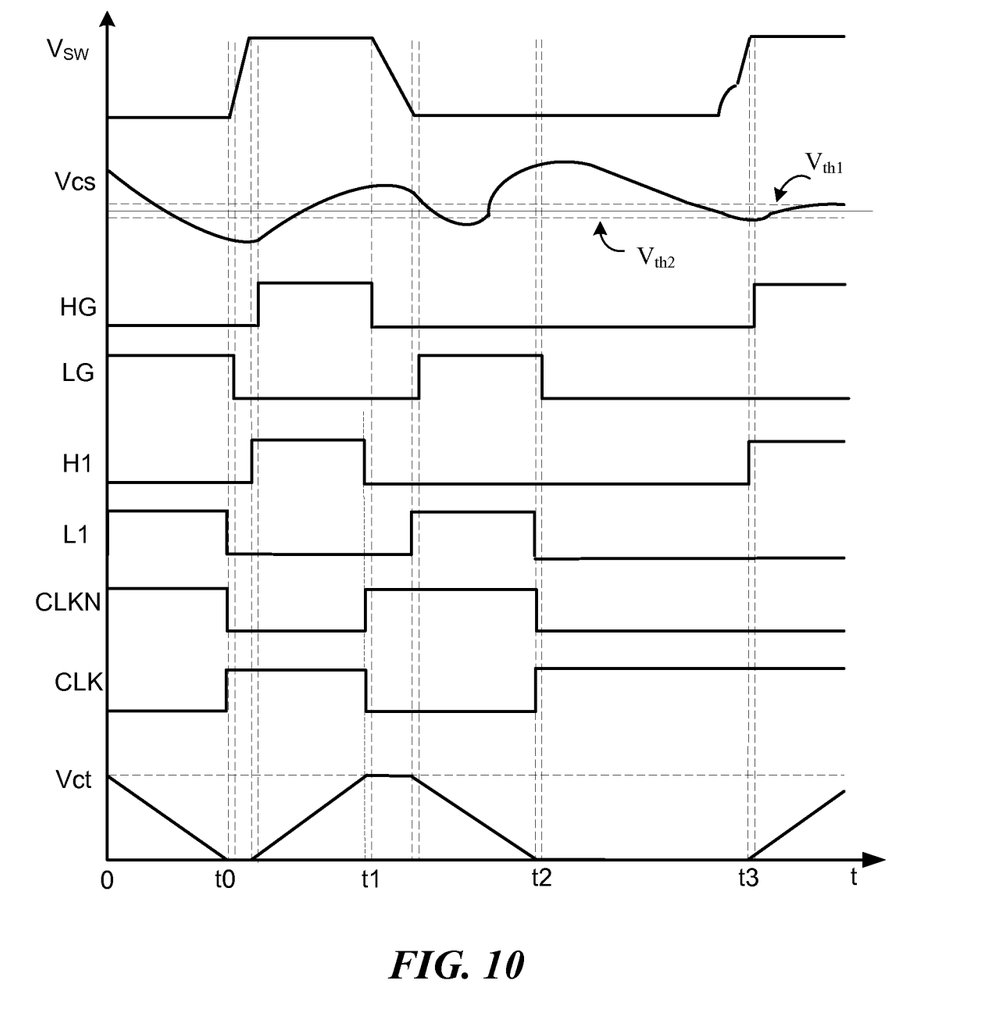
FIG. 10 schematically shows waveforms of the switching mode power supply 300 in FIG. 9.

FIG. 10 schematically shows waveforms of the switching mode power supply 300 in FIG. 9. The waveforms in FIG. 10 is similar to the waveforms in FIG. 8, with a difference that in FIG. 10, both the rising edges and falling edges of the first logical delayed signal HD and the second logical delayed signal LD have a certain delay compared to the first logical signal H1 and the second logical signal L1.

In the switching mode power supply 300, because the polarity evaluating circuit 106 generates the capacitive evaluated signal $M_c$ by evaluating the current direction of the current sense signal $V_{cs}$ based on the rising edges of the clock signal CLK and the inverted clock signal CLKN, and the first logical signal H1 and the second logical signal L1 are delayed by the intermediate circuit 112 for a short pulse time period, so the first driving signal HG and the second driving signal LG lag behind the rising edges of the clock signal CLK and the inverted clock signal CLKN for a short pulse time period (tens of nanoseconds). So the switching mode power supply 300 detects and evaluates the current direction of the current flowing through the resonant inductor before the turning off of the first power switch or before the turning off of the second power switch: if the evaluation indicates that the system will enter inductive mode, the switching mode power supply operates normally; if the evaluation indicates that the system will enter capacitive mode, the switching mode power supply triggers the capacitive protection. So the switching mode power supply 300 prevents the system from operating under capacitive mode, and the capacitive switch is avoided.

In the actual application, at some instance (e.g., short circuit), the evaluation of the polarity evaluate circuit indicates that the system will enter inductive mode at the rising edge of the clock signal and/or at the rising edge of the inverted clock signal. But the current flowing through the resonant inductor may vary sharply, which may lead to the change of the current direction at the turning on of the first power switch and/or at the the turning on of the second power switch, causing the system to enter capacitive mode. In order to avoid such situation, a "double check" method (i.e., detecting the capacitive mode several times) is provided in accordance with an embodiment of the present invention.

Figure 11:
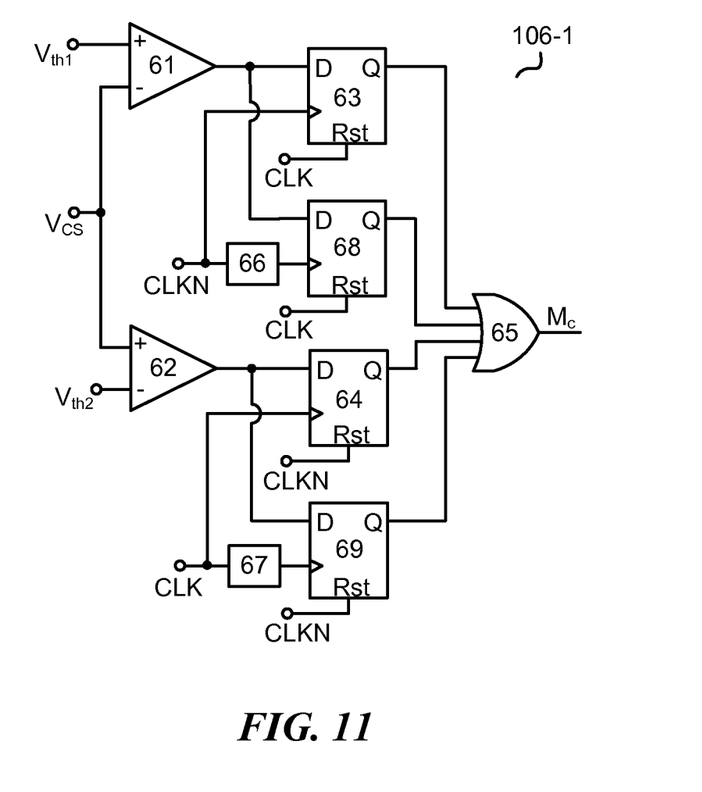
FIG. 11 schematically shows a circuit configuration of the polarity evaluating circuit 106-1 in accordance with an embodiment of the present invention.

FIG. 11 schematically shows a circuit configuration of the polarity evaluating circuit 106-1 in accordance with an embodiment of the present invention. In the example of FIG. 11, the polarity evaluating circuit 106-1 comprises: a positive comparator 61, having a first input terminal, a second input terminal and an output terminal, wherein the first input terminal is configured to receive the current sense signal $V_{cs}$, the second input terminal is configured to receive a first threshold $V_{th1}$, wherein the positive comparator 61 generates a positive comparison signal based on the current sense signal $V_{cs}$ and the first threshold $V_{th1}$; a negative comparator 62, having a first input terminal, a second input terminal and an output terminal, wherein the first input terminal is configured to receive the current sense signal $V_{cs}$, the second input terminal is configured to receive a second threshold $V_{th2}$, wherein the negative comparator 62 generates a negative comparison signal based on the current sense signal $V_{cs}$ and the second threshold $V_{th2}$; a first D flip flop 63, having a trigger input terminal D, a clock input terminal, a reset terminal Rst and an output terminal, wherein the trigger input terminal D is coupled to the positive comparator 61 to receive the positive comparison signal, the clock input terminal is configured to receive the inverted clock signal CLKN, and the reset terminal Rst is configured to receive the clock signal CLK, wherein based on the positive comparison signal and the rising edge of the inverted clock signal CLKN, the first D flip flop 63 generates a positive evaluated signal at the output terminal, and resets the positive evaluated signal at the rising edge of the clock signal CLK; a second D flip flop 64, having a trigger input terminal D, a clock input terminal, a reset terminal Rst and an output terminal, wherein the trigger input terminal D is coupled to the negative comparator 62 to receive the negative comparison signal, the clock input terminal is configured to receive the clock signal CLK, and the reset terminal Rst is configured to receive the inverted clock signal CLKN, wherein based on the negative comparison signal and the rising edge of the clock signal CLK, the second D flip flop 64 generates a negative evaluated signal at the output terminal, and resets the negative evaluated signal at the rising edge of the inverted clock signal CLKN; a first delay circuit 66, configured to receive the inverted clock signal CLKN to generate an inverted clock delay signal by delaying the rising edge of the inverted clock signal CLKN; a third D flip flop 68, having a trigger input terminal D, a clock input terminal, a reset terminal Rst and an output terminal, wherein the trigger input terminal D is coupled to the positive comparator 61 to receive the positive comparison signal, the clock input terminal is coupled to the first delay circuit 66 to receive the inverted clock delay signal, and the reset terminal Rst is configured to receive the clock signal CLK, wherein based on the positive comparison signal and the rising edge of the inverted clock delay signal, the third D flip flop 68 generates a positive confirm signal at the output terminal, and resets the positive confirm signal at the rising edge of the clock signal CLK; a second delay circuit 67, configured to receive the clock signal CLK to generate a clock delay signal by delaying the rising edge of the clock signal CLK; a fourth D flip flop 69, having a trigger input terminal D, a clock input terminal, a reset terminal Rst and an output terminal, wherein the trigger input terminal D is coupled to the negative comparator 62 to receive the negative comparison signal, the clock input terminal is coupled to the second delay circuit 67 to receive the clock delay signal, and the reset terminal Rst is configured to receive the inverted clock signal CLKN, wherein based on the negative comparison signal and the rising edge of the clock delay signal, the fourth D flip flop 69 generates a negative confirm signal at the output terminal, and resets the negative confirm signal at the rising edge of the inverted clock signal CLKN; and a logical OR circuit 65, configured to receive the positive evaluated signal, the positive confirm signal, the negative evaluated signal, and the negative confirm signal, to generate the capacitive evaluated signal MC.

In one embodiment, the first delay circuit 66 and the second delay circuit 67 have a delay time that is same as the minimum dead time of the switching mode power supply.

Figure 12:
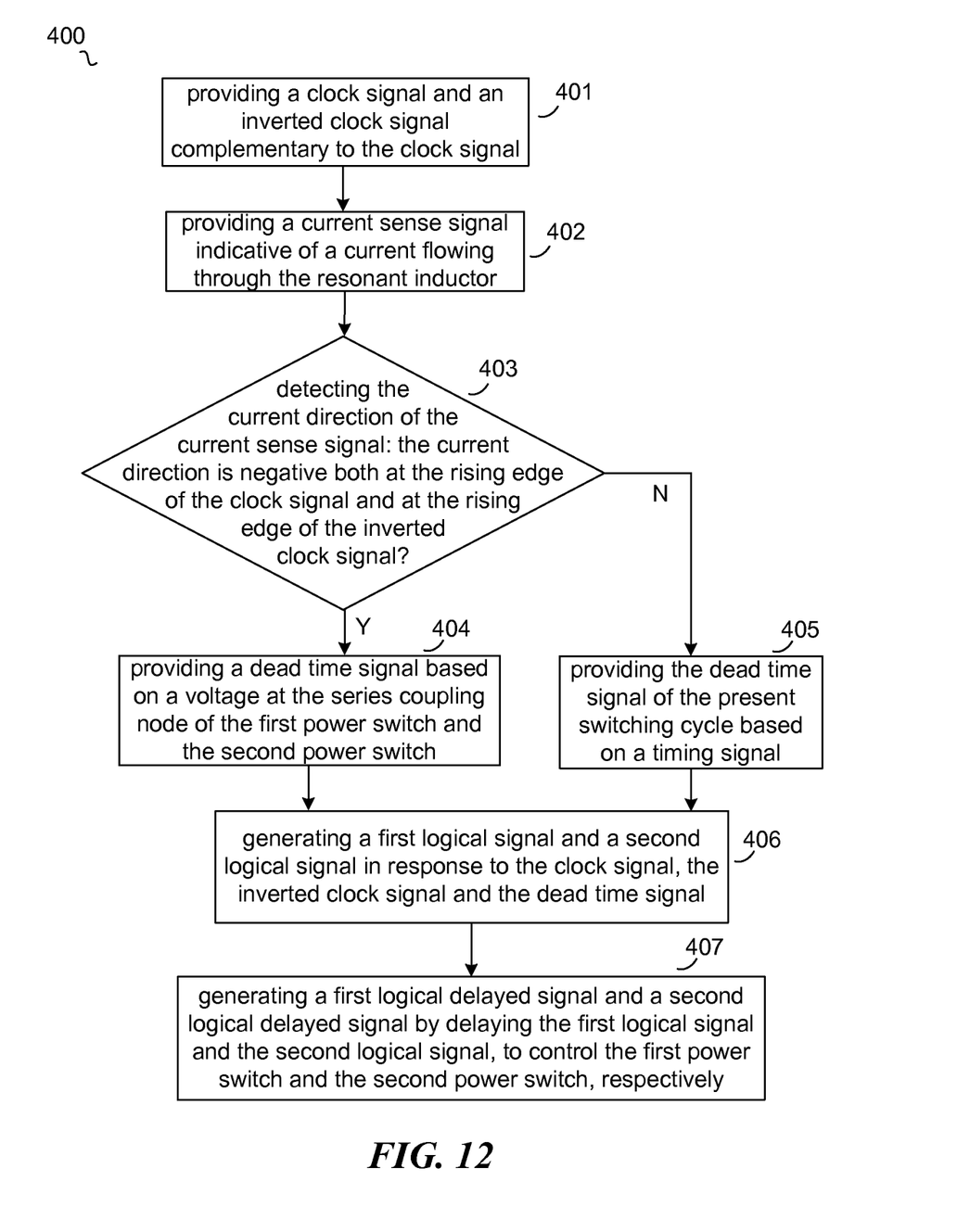
FIG. 12 schematically shows a method 400 used for a switching mode power supply in accordance with an embodiment of the present invention.

FIG. 12 schematically shows a method 400 used for a switching mode power supply in accordance with an embodiment of the present invention. The switching mode power supply is configured to receive an input voltage to generate an output voltage. The switching mode power supply comprises a power stage and a resonant tank, the power stage including a first power switch and a second power switch coupled in series, and the resonant tank including a resonant inductor and a resonant capacitor. The method comprises:

Step 401: providing a clock signal and an inverted clock signal complementary to the clock signal.

Step 402: providing a current sense signal indicative of a current flowing through the resonant inductor.

Step 403: detecting the current direction of the current sense signal: if the current direction is negative both at the rising edge of the clock signal and at the rising edge of the inverted clock signal, going to step 404; on the contrary, if the current direction is negative at the rising edge of the inverted clock signal, or if the current direction is positive at the rising edge of the clock signal, going to step 405.

Step 404: providing a dead time signal based on a voltage at the series coupling node of the first power switch and the second power switch.

Step 405: providing the dead time signal of the present switching cycle based on a timing signal.

Step 406: generating a first logical signal and a second logical signal in response to the clock signal, the inverted clock signal and the dead time signal. And Step 407: generating a first logical delayed signal and a second logical delayed signal by delaying the first logical signal and the second logical signal, to control the first power switch and the second power switch, respectively.

In one embodiment, the clock signal and the inverted clock signal each has a 50% duty cycle.

In one embodiment, the step 403 detecting the current direction of the current sense signal further comprises: delaying the rising edge of the inverted clock signal and the rising edge of the clock signal, to generate an inverted clock delay signal and a clock delay signal, respectively; if the current direction is positive both at the rising edge of the inverted clock signal and at the rising edge of the inverted clock delay signal, and is negative both at the rising edge of the clock signal and at the rising edge of the clock delay signal, providing the dead time signal based on the voltage at the series coupling node of the first power switch and the second power switch; if the current direction is negative at the rising edge of the inverted clock signal or at the rising edge of the inverted clock delay signal, or if the current direction is positive at the rising edge of the clock signal or at the rising edge of the clock delay signal, providing the dead time signal of the present switching cycle based on a timing signal.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

We claim:

1. A controller used in a switching mode power supply, the switching mode power supply having a power stage and a resonant tank, the power stage including a first power switch and a second power switch coupled in series, and the resonant tank including a resonant inductor and a resonant capacitor, the controller comprising:
   a polarity evaluating circuit, configured to receive a clock signal and a current sense signal indicative of a current flowing through the resonant inductor, wherein the polarity evaluating circuit generates a capacitive evaluated signal based on the current sense signal and the clock signal;
   a control and logic circuit, configured to receive the clock signal and the capacitive evaluated signal, to generate a first logical signal and a second logical signal;
   a logic delay circuit, coupled to the control and logic circuit to receive the first logical signal and the second logical signal, wherein the logic delay circuit generates a first logical delayed signal and a second logical delayed signal based on the first logical signal and the second logical signal; and
   a driven circuit, coupled to the logical delay circuit to receive the first logical delayed signal and the second logical delayed signal to generate a first driving signal and a second driving signal, to control the first power switch and the second power switch, respectively.

2. The controller of claim 1, wherein the polarity evaluating circuit comprises:
   a positive comparator, having a first input terminal, a second input terminal and an output terminal, wherein the first input terminal is configured to receive the current sense signal, the second input terminal is configured to receive a first threshold, and wherein the positive comparator generates a positive comparison signal based on the current sense signal and the first threshold;
   a negative comparator, having a first input terminal, a second input terminal and an output terminal, wherein the first input terminal is configured to receive the current sense signal, the second input terminal is configured to receive a second threshold, and wherein the negative comparator generates a negative comparison signal based on the current sense signal and the second threshold;
   a first D flip flop, having a trigger input terminal, a clock input terminal, a reset terminal and an output terminal, wherein the trigger input terminal is coupled to the positive comparator to receive the positive comparison signal, the clock input terminal is configured to receive an inverted clock signal complementary to the clock signal, and the reset terminal is configured to receive the clock signal, wherein based on the positive comparison signal and the rising edge of the inverted clock signal, the first D flip flop generates a positive evaluated signal at the output terminal, and resets the positive evaluated signal at the rising edge of the clock signal;
   a second D flip flop, having a trigger input terminal, a clock input terminal, a reset terminal and an output terminal, wherein the trigger input terminal is coupled to the negative comparator to receive the negative comparison signal, the clock input terminal is configured to receive the clock signal, and the reset terminal is configured to receive the inverted clock signal, wherein based on the negative comparison signal and the rising edge of the clock signal, the second D flip flop generates a negative evaluated signal at the output terminal, and resets the negative evaluated signal at the rising edge of the inverted clock signal; and
   a logical OR circuit, having a first input terminal, a second input terminal and an output terminal, wherein the first input terminal is configured to receive the positive evaluated signal, the second input terminal is configured to receive the negative evaluated signal, wherein based on the positive evaluated signal and the negative evaluated signal, the logical OR circuit generates the capacitive evaluated signal at the output terminal.

3. The controller of claim 1, wherein the polarity evaluating circuit evaluates the current polarity of the current sense signal at the falling edges of the first logical signal and the second logical signal to generate the capacitive evaluated signal.

4. The controller of claim 1, wherein the control and logic circuit comprises:
   a timer, configured to provide a timing signal;
   a first logical AND circuit having a first input terminal, a second input terminal and an output terminal, wherein the first input terminal is coupled to the timer to receive the timing signal, the second input terminal is configured to receive the capacitive evaluated signal, wherein based on the timing signal and the capacitive evaluated signal, the first logical AND circuit generates a capacitive reset signal;
   a first logical OR circuit, having a first input terminal, a second input terminal and an output terminal, wherein the first input terminal is coupled to the first logical AND circuit to receive the capacitive reset signal, the second input terminal is configured to receive a first dead time setting signal, wherein based on the capacitive reset signal and the first dead time setting signal, the first logical OR circuit generates a first reset signal at the output terminal;
   a second logical OR circuit, having a first input terminal, a second input terminal and an output terminal, wherein the first input terminal is coupled to the first logical AND circuit to receive the capacitive reset signal, the second input terminal is configured to receive the second dead time setting signal, wherein based on the capacitive reset signal and the second dead time setting signal, the second logical OR circuit generates a second reset signal at the output terminal;
   a first RS flip flop, having a set input terminal, a reset input terminal and an output terminal, wherein the set input terminal is configured to receive the clock signal, the reset input terminal is coupled to the first logical OR circuit to receive the first reset signal, wherein based on the clock signal and the first reset signal, the first RS flip flop generates the first dead time signal at the output terminal;

a second RS flip flop, having a set input terminal, a reset input terminal and an output terminal, wherein the set input terminal is configured to receive the inverted clock signal, the reset input terminal is coupled to the second logical OR circuit to receive the second reset signal, wherein based on the inverted clock signal and the second reset signal, the second RS flip flop generates a second dead time signal at the output terminal;

a logical NOR circuit, having a first input terminal, a second input terminal, a first output terminal and a second output terminal, wherein the first input terminal is coupled to the first RS flip flop to receive the first dead time signal, the second input terminal is coupled to the second RS flip flop to receive the second dead time signal, wherein based on the first dead time signal and the second dead time signal, the logical NOR circuit generates a dead time signal at the first output terminal and a non-dead time signal at the second output terminal;

a second logical AND circuit, having a first input terminal, a second input terminal and an output terminal, wherein the first input terminal is coupled to the logical NOR circuit to receive the non-dead time signal, the second input terminal is configured to receive the clock signal, wherein based on the non-dead time signal and the clock signal, the second logical AND circuit generates the first logical signal at the output terminal; and a third logical AND circuit, having a first input terminal, a second input terminal and an output terminal, wherein the first input terminal is coupled to the logical NOR circuit to receive the non-dead time signal, the second input terminal is configured to receive the inverted clock signal, wherein based on the non-dead time signal and the inverted clock signal, the third logical AND circuit generates the second logical signal at the output terminal.

5. The controller of claim 1, wherein the logic delay circuit comprises:

a first short pulse circuit, configured to receive the inverted clock signal to generate a first short pulse signal in response to the rising edge of the inverted clock signal;

a first logical OR unit, having a first input terminal, a second input terminal and an output terminal, wherein the first input terminal is coupled to the first short pulse circuit to receive the first short pulse signal, the second input terminal is configured to receive the first logical signal, wherein based on the first short pulse signal and the first logical signal, the first logical OR unit generates a first logical delayed signal;

a second short pulse circuit, configured to receive the clock signal to generate a second short pulse signal in response to the rising edge of the clock signal; and a second logical OR unit, having a first input terminal, a second input terminal and an output terminal, wherein the first input terminal is coupled to the second short pulse circuit to receive the second short pulse signal, the second input terminal is configured to receive the second logical signal, wherein based on the second short pulse signal and the second logical signal, the second logical OR unit generates a second logical delayed signal.

6. The controller of claim 1, wherein the polarity evaluating circuit comprises:

a positive comparator, having a first input terminal, a second input terminal and an output terminal, wherein the first input terminal is configured to receive the current sense signal, the second input terminal is configured to receive a first threshold, wherein the positive comparator generates a positive comparison signal based on the current sense signal and the first threshold;

a negative comparator, having a first input terminal, a second input terminal and an output terminal, wherein the first input terminal is configured to receive the current sense signal, the second input terminal is configured to receive a second threshold, wherein the negative comparator generates a negative comparison signal based on the current sense signal and the second threshold;

a first D flip flop, having a trigger input terminal, a clock input terminal, a reset terminal and an output terminal, wherein the trigger input terminal is coupled to the positive comparator to receive the positive comparison signal, the clock input terminal is configured to receive the inverted clock signal, and the reset terminal is configured to receive the clock signal, wherein based on the positive comparison signal and the rising edge of the inverted clock signal, the first D flip flop generates a positive evaluated signal at the output terminal, and resets the positive evaluated signal at the rising edge of the clock signal;

a second D flip flop, having a trigger input terminal, a clock input terminal, a reset terminal and an output terminal, wherein the trigger input terminal is coupled to the negative comparator to receive the negative comparison signal, the clock input terminal is configured to receive the clock signal, and the reset terminal is configured to receive the inverted clock signal, wherein based on the negative comparison signal and the rising edge of the clock signal, the second D flip flop generates a negative evaluated signal at the output terminal, and resets the negative evaluated signal at the rising edge of the inverted clock signal;

a first delay circuit, configured to receive the inverted clock signal to generate an inverted clock delay signal by delaying the rising edge of the inverted clock signal;

a third D flip flop, having a trigger input terminal, a clock input terminal, a reset terminal and an output terminal, wherein the trigger input terminal is coupled to the positive comparator to receive the positive comparison signal, the clock input terminal is coupled to the first delay circuit to receive the inverted clock delay signal, and the reset terminal is configured to receive the clock signal, wherein based on the positive comparison signal and the rising edge of the inverted clock delay signal, the third D flip flop generates a positive confirm signal at the output terminal, and resets the positive confirm signal at the rising edge of the clock signal;

a second delay circuit, configured to receive the clock signal to generate a clock delay signal by delaying the rising edge of the clock signal;

a fourth D flip flop, having a trigger input terminal, a clock input terminal, a reset terminal and an output terminal, wherein the trigger input terminal is coupled to the negative comparator to receive the negative comparison signal, the clock input terminal is coupled to the second delay circuit to receive the clock delay signal, and the reset terminal is configured to receive the inverted clock signal, wherein based on the negative comparison signal and the rising edge of the clock delay signal, the fourth D flip flop generates a negative confirm signal at the output terminal, and resets the negative confirm signal at the rising edge of the inverted clock signal; and a logical OR circuit, configured to receive the positive evaluated signal, the positive confirm signal, the negative evaluated signal, and the negative confirm signal, to generate the capacitive evaluated signal.

7. The controller of claim 1, wherein the logic delay circuit comprises a plurality of intermediate processing circuits.

8. A switching mode power supply, comprising:
a power stage, having a first power switch and a second power switch coupled in series;
a resonant tank, having a resonant inductor and a resonant capacitor;
a polarity evaluating circuit, configured to receive a clock signal and a current sense signal indicative of a current flowing through the resonant inductor, to generate a capacitive evaluated signal;
a control and logic circuit, configured to receive the clock signal and the capacitive evaluated signal, to generate a first logical signal and a second logical signal;
a logic delay circuit, configured to receive the first logical signal and the second logical signal, to generate a first logical delayed signal and a second logical delayed signal; and
a driven circuit, configured to receive the first logical delayed signal and the second logical delayed signal, to generate a first driving signal and a second driving signal, to control the first power switch and the second power switch, respectively.

9. The switching mode power supply of claim 8, wherein the polarity evaluating circuit evaluates the current polarity of the current sense signal at the falling edges of the first logical signal and the second logical signal to generate the capacitive evaluated signal.

10. The switching mode power supply of claim 8, wherein the polarity evaluating circuit comprises:
a positive comparator, configured to receive the current sense signal and a first threshold, to generate a positive comparison signal;
a negative comparator, configured to receive the current sense signal and a second threshold, to generate a negative comparison signal;
a first D flip flop, having a trigger input terminal, a clock input terminal, a reset terminal and an output terminal, wherein the trigger input terminal is coupled to the positive comparator to receive the positive comparison signal, the clock input terminal is configured to receive an inverted clock signal complementary to the clock signal, and the reset terminal is configured to receive the clock signal, wherein based on the positive comparison signal and the rising edge of the inverted clock signal, the first D flip flop generates a positive evaluated signal at the output terminal, and resets the positive evaluated signal at the rising edge of the clock signal;
a second D flip flop, having a trigger input terminal, a clock input terminal, a reset terminal and an output terminal, wherein the trigger input terminal is coupled to the negative comparator to receive the negative comparison signal, the clock input terminal is configured to receive the clock signal, and the reset terminal is configured to receive the inverted clock signal, wherein based on the negative comparison signal and the rising edge of the clock signal, the second D flip flop generates a negative evaluated signal at the output terminal, and resets the negative evaluated signal at the rising edge of the inverted clock signal; and a logical OR circuit, configured to receive the positive evaluated signal and the negative evaluated signal, to generate the capacitive evaluated signal.

11. The switching mode power supply of claim 8, wherein the control and logic circuit comprises:
a timer, configured to provide a timing signal;
a first logical AND circuit, configured to receive the timing signal and the capacitive evaluated signal, to generate a capacitive reset signal;
a first logical OR circuit, configured to receive the capacitive reset signal and a first dead time setting signal, to generate a first reset signal;
a second logical OR circuit, configured to receive the capacitive reset signal and the second dead time setting signal, to generate a second reset signal;
a first RS flip flop, having a set input terminal, a reset input terminal and an output terminal, wherein the set input terminal is configured to receive the clock signal, the reset input terminal is coupled to the first logical OR circuit to receive the first reset signal, wherein based on the clock signal and the first reset signal, the first RS flip flop generates the first dead time signal at the output terminal;
a second RS flip flop, having a set input terminal, a reset input terminal and an output terminal, wherein the set input terminal is configured to receive the inverted clock signal, the reset input terminal is coupled to the second logical OR circuit to receive the second reset signal, wherein based on the inverted clock signal and the second reset signal, the second RS flip flop generates a second dead time signal at the output terminal;
a logical NOR circuit, configured to receive the first dead time signal and the second dead time signal, to generate a dead time signal and a non-dead time signal;
a second logical AND circuit, configured to receive the non-dead time signal and the clock signal, to generate the first logical signal; and
a third logical AND circuit, configured to receive the non-dead time signal and the inverted clock signal, to generate the second logical signal.

12. The switching mode power supply of claim 8, wherein the logic delay circuit comprises:
a first short pulse circuit, configured to receive the inverted clock signal to generate a first short pulse signal in response to the rising edge of the inverted clock signal;
a first logical OR unit, configured to receive the first short pulse signal and the first logical signal, to generate a first logical delayed signal;
a second short pulse circuit, configured to receive the clock signal to generate a second short pulse signal in response to the rising edge of the clock signal; and
a second logical OR unit, configured to receive the second short pulse signal and the second logical signal, to generate a second logical delayed signal.

13. The switching mode power supply of claim 8, wherein the polarity evaluating circuit comprises:
a positive comparator, configured to receive the current sense signal and a first threshold, to generate a positive comparison signal;
a negative comparator, configured to receive the current sense signal and a second threshold, to generate a negative comparison signal;

a first D flip flop, having a trigger input terminal, a clock input terminal, a reset terminal and an output terminal, wherein the trigger input terminal is coupled to the positive comparator to receive the positive comparison signal, the clock input terminal is configured to receive the inverted clock signal, and the reset terminal is configured to receive the clock signal, wherein based on the positive comparison signal and the rising edge of the inverted clock signal, the first D flip flop generates a positive evaluated signal at the output terminal, and resets the positive evaluated signal at the rising edge of the clock signal;

a second D flip flop, having a trigger input terminal, a clock input terminal, a reset terminal and an output terminal, wherein the trigger input terminal is coupled to the negative comparator to receive the negative comparison signal, the clock input terminal is configured to receive the clock signal, and the reset terminal is configured to receive the inverted clock signal, wherein based on the negative comparison signal and the rising edge of the clock signal, the second D flip flop generates a negative evaluated signal at the output terminal, and resets the negative evaluated signal at the rising edge of the inverted clock signal;

a first delay circuit, configured to receive the inverted clock signal to generate an inverted clock delay signal by delaying the rising edge of the inverted clock signal;

a third D flip flop, having a trigger input terminal, a clock input terminal, a reset terminal and an output terminal, wherein the trigger input terminal is coupled to the positive comparator to receive the positive comparison signal, the clock input terminal is coupled to the first delay circuit to receive the inverted clock delay signal, and the reset terminal is configured to receive the clock signal, wherein based on the positive comparison signal and the rising edge of the inverted clock delay signal, the third D flip flop generates a positive confirm signal at the output terminal, and resets the positive confirm signal at the rising edge of the clock signal;

a second delay circuit, configured to receive the clock signal to generate a clock delay signal by delaying the rising edge of the clock signal;

a fourth D flip flop, having a trigger input terminal, a clock input terminal, a reset terminal and an output terminal, wherein the trigger input terminal is coupled to the negative comparator to receive the negative comparison signal, the clock input terminal is coupled to the second delay circuit to receive the clock delay signal, and the reset terminal is configured to receive the inverted clock signal, wherein based on the negative comparison signal and the rising edge of the clock delay signal, the fourth D flip flop generates a negative confirm signal at the output terminal, and resets the negative confirm signal at the rising edge of the inverted clock signal; and a logical OR circuit, configured to receive the positive evaluated signal, the positive confirm signal, the negative evaluated signal, and the negative confirm signal, to generate the capacitive evaluated signal.

14. The switching mode power supply of claim 8, wherein the logic delay circuit comprises a plurality of intermediate processing circuits.

15. A method used for a switching mode power supply, the switching mode power supply comprises a power stage and a resonant tank, the power stage including a first power switch and a second power switch coupled in series, and the resonant tank including a resonant inductor and a resonant capacitor, the method comprising:

providing a clock signal and an inverted clock signal complementary to the clock signal;

providing a current sense signal indicative of a current flowing through the resonant inductor;

detecting the current direction of the current sense signal:
if the current direction is negative both at the rising edge of the clock signal and at the rising edge of the inverted clock signal, providing a dead time signal based on a voltage at the series coupling node of the first power switch and the second power switch; and if the current direction is negative at the rising edge of the inverted clock signal, or if the current direction is positive at the rising edge of the clock signal, providing the dead time signal of the present switching cycle based on a timing signal;

generating a first logical signal and a second logical signal in response to the clock signal, the inverted clock signal and the dead time signal; and generating a first logical delayed signal and a second logical delayed signal by delaying the first logical signal and the second logical signal, to control the first power switch and the second power switch, respectively.

16. The method of claim 15, wherein the clock signal and the inverted clock signal each has a 50% duty cycle.

17. The method of claim 15, wherein the step detecting the current direction of the current sense signal further comprises:

delaying the rising edge of the inverted clock signal and the rising edge of the clock signal, to generate an inverted clock delay signal and a clock delay signal, respectively;

if the current direction is positive both at the rising edge of the inverted clock signal and at the rising edge of the inverted clock delay signal, and is negative both at the rising edge of the clock signal and at the rising edge of the clock delay signal, providing the dead time signal based on the voltage at the series coupling node of the first power switch and the second power switch; and if the current direction is negative at the rising edge of the inverted clock signal or at the rising edge of the inverted clock delay signal, or if the current direction is positive at the rising edge of the clock signal or at the rising edge of the clock delay signal, providing the dead time signal of the present switching cycle based on a timing signal.

* * * * *